United States Patent [19]

Christiansen et al.

[11] Patent Number: 5,096,152
[45] Date of Patent: Mar. 17, 1992

[54] ARMREST COMPARTMENT WITH CUPHOLDER

[75] Inventors: Ned Christiansen, Three Rivers; David Kellogg, Kalamazoo, both of Mich.

[73] Assignee: Lear Seating Corporation, Southfield, Mich.

[21] Appl. No.: 468,077

[22] Filed: Jan. 22, 1990

[51] Int. Cl.$^5$ .............................................. A47B 37/00
[52] U.S. Cl. ................... 248/311.2; 297/194; 248/278; 224/275
[58] Field of Search ...................... 248/311.2, 291, 313, 248/278; 297/194, 188; 108/44; 211/81, 71, 74; 224/275, 42.44

[56] References Cited

U.S. PATENT DOCUMENTS

| 4,645,157 | 2/1987 | Parker | 248/311.2 |
| 4,792,184 | 12/1988 | Lindberg et al. | 297/194 |
| 4,818,017 | 4/1989 | Dykstra et al. | 297/194 |
| 4,848,627 | 7/1989 | Maeda et al. | 248/311.2 X |
| 4,928,865 | 5/1990 | Lorence et al. | 248/311.2 X |
| 4,953,771 | 9/1990 | Fischer et al. | 211/71 X |

FOREIGN PATENT DOCUMENTS 21978 of 1900 United Kingdom ............. 248/311.2

Primary Examiner—Karen J. Chotkowski
Attorney, Agent, or Firm—Reising, Ethington, Barnard, Perry & Milton

[57] ABSTRACT

A vehicular armrest (20) includes an interior compartment (40) which receives a beverage container holding assembly. The holding assembly is pivotally secured to the armrest (20) for rotation between a stored position inside the compartment (40) and an operational position outside the armrest compartment (40). The holding assembly includes two semi-circular arms (54,54') which are operatively connected to an actuating mechanism (52) which automatically expands the semi-circular members (54, 54') upon rotation toward the operational position. In the operational position, the two semi-circular members (54,54') form two distinct beverage container receptacles in the holding assembly. The actuating mechanism also automatically collapses the semi-circular arms (54,54') as the holding assembly is rotated toward the storage position to compactly store the holding asembly within the compartment (40) of the armrest (20). A T-shaped bar (92) is pivotally attached to the holding assembly to support the bottom of a beverage container (C) when the arms (54,54') are in the expanded operational position.

41 Claims, 6 Drawing Sheets

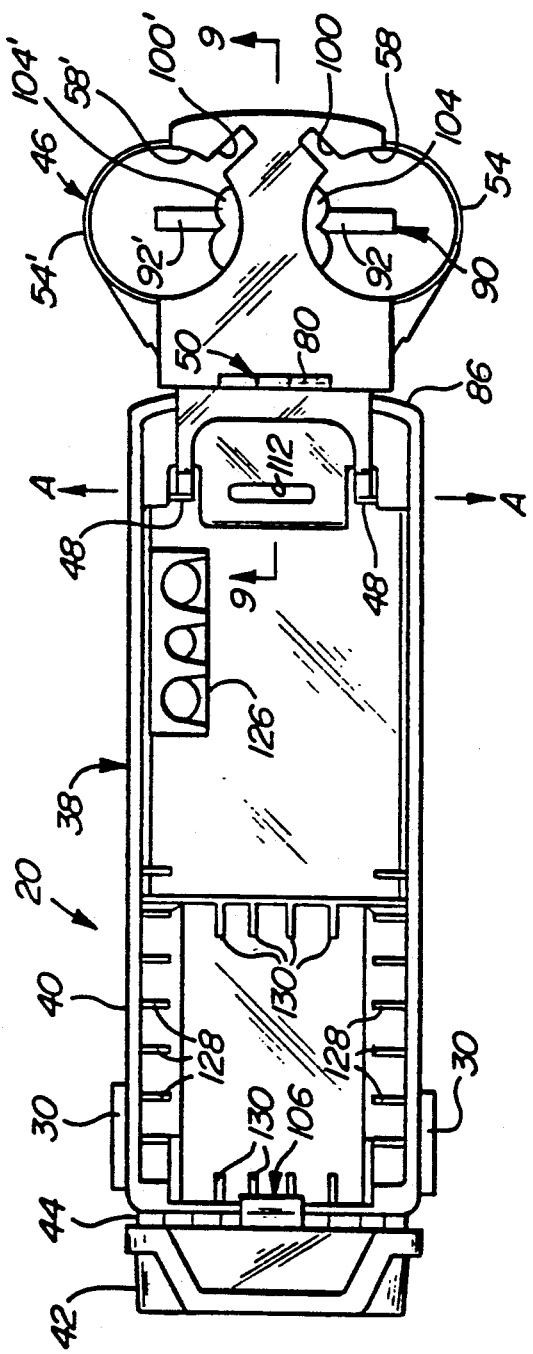
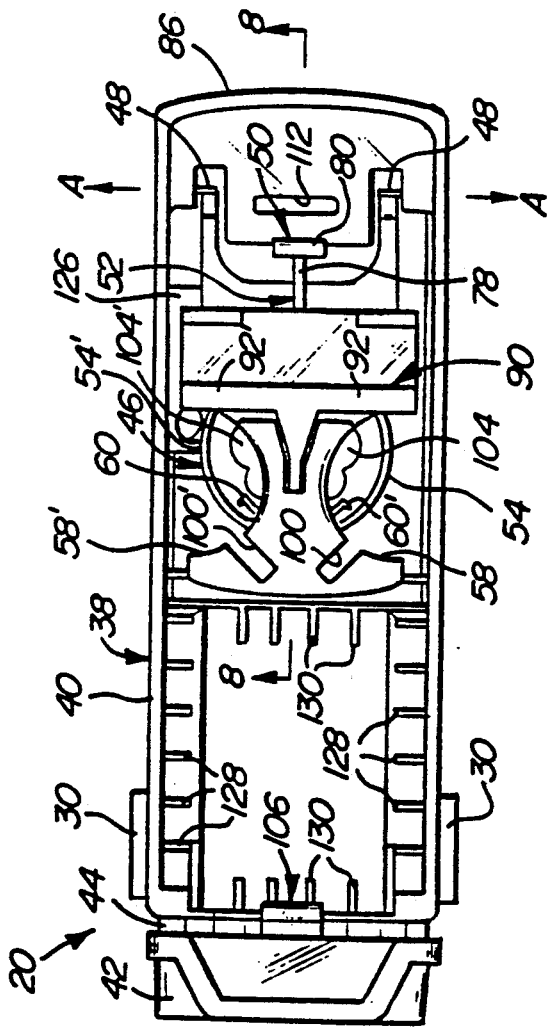
FIG. 4
FIG. 5

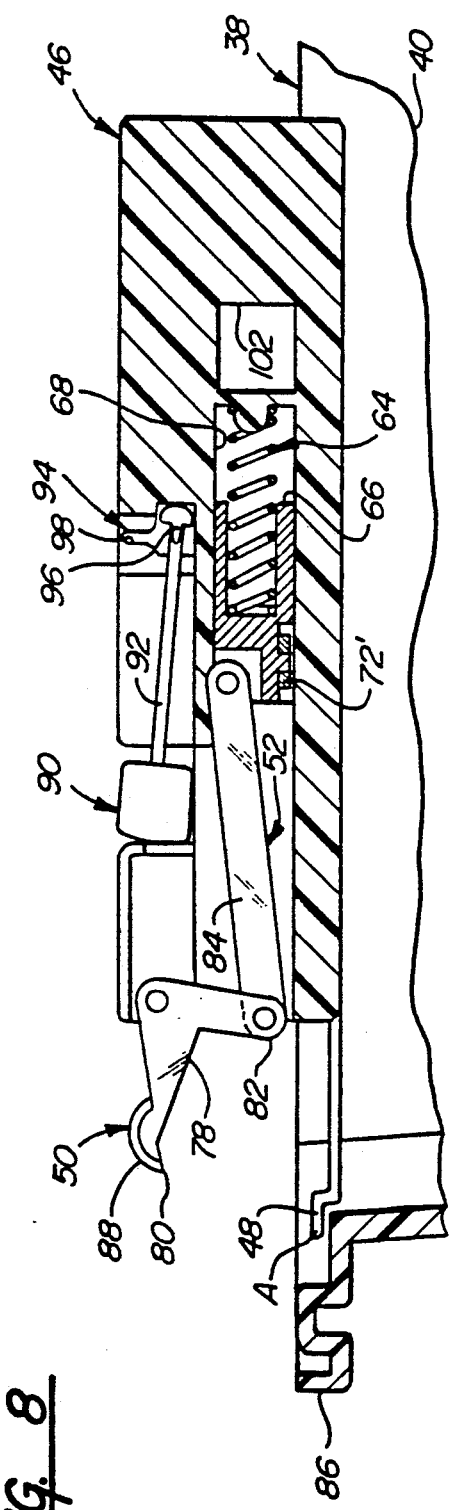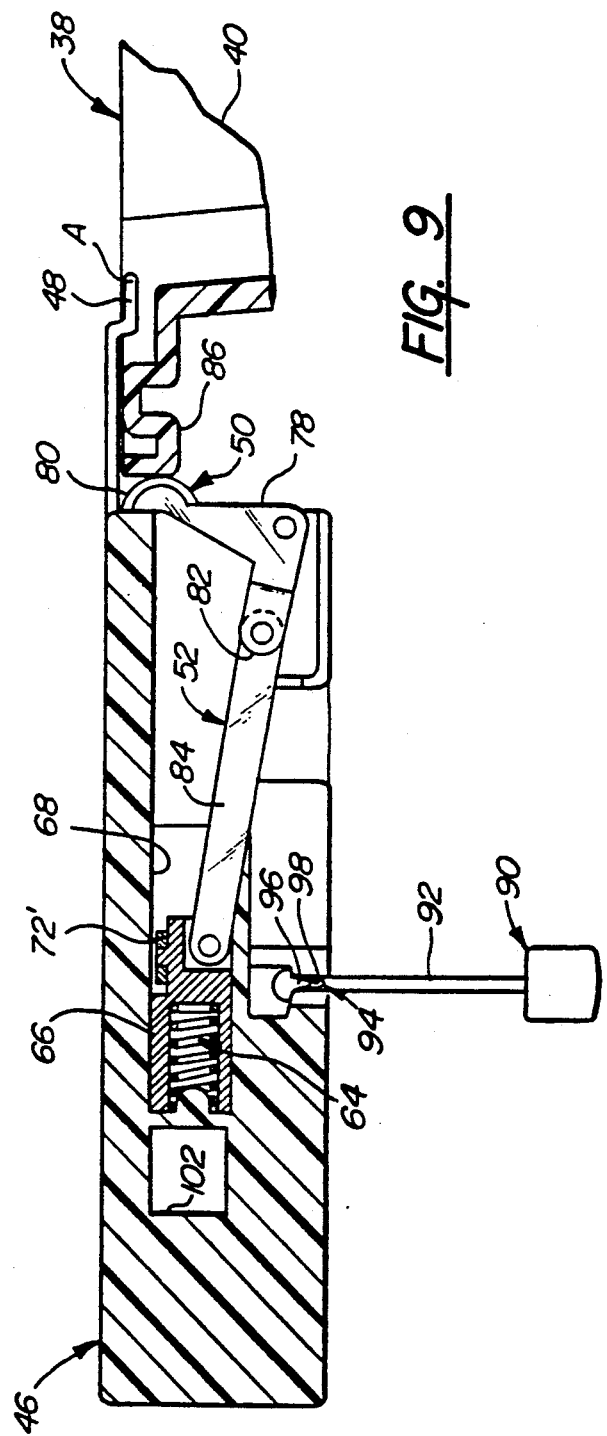

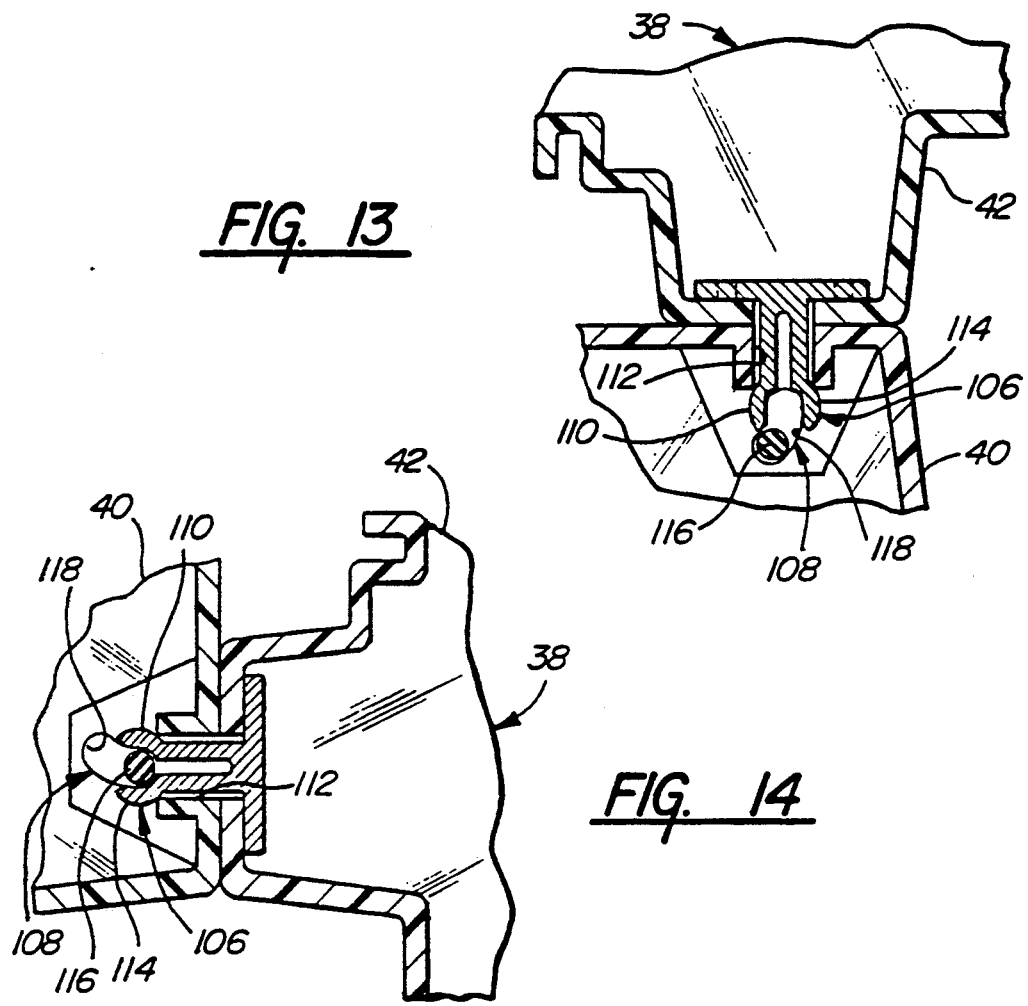
FIG. 13
FIG. 14
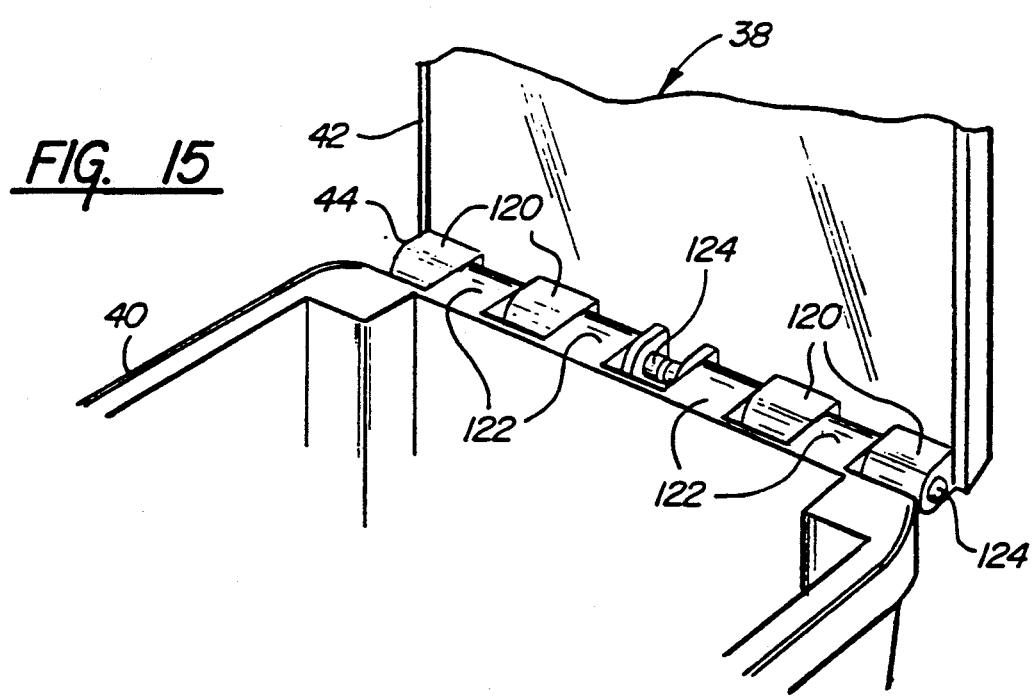
FIG. 15

ARMREST COMPARTMENT WITH CUPHOLDER

TECHNICAL FIELD

The present invention relates to beverage container holding assemblies, and more particularly to beverage container holding assemblies which can be compactly stored in a recessed compartment of an armrest for a vehicle.

BACKGROUND ART

It is frequently convenient to consume beverages while an occupant in a vehicle. The ability to set the beverage container upon a stable support or in a receptacle is desirable, and particularly useful for the driver who may require the use of both hands.

Beverage container holding assemblies for this purpose are well known in the prior art and are mounted in such diverse locations as adjacent the dash board, the vehicle door, the floor board, and upon the passenger seat. However, it has been found particularly appealing to locate the beverage container holding assembly inside a compartment of vehicle armrest disposed between the driver and passenger seating portions in the vehicle.

For example, the U.S. Pat. Nos. 4,417,764 to Marcus et al, issued Nov. 29, 1983 and 4,783,037 to Flowerday, issued Nov. 8, 1988 each disclose beverage container holding assemblies which are slideably mounted in the end of a vehicle armrest for linear movement between a recessed storage condition and an extended operational position. Conversely, the U.S. Pat. Nos. 4,733,908 to Dykstra et al, issued Mar. 29, 1988 and 4,792,184 to Lindberg et al, issued Dec. 20, 1988, both disclose beverage container holding assemblies which are pivotally mounted to a vehicle armrest for arcuate movement between a storage position in the armrest and an operational position outside the armrest.

The Flowerday teachings are most advantageous in that two pivoted arms are provided for supporting the girth of the beverage container, which arms expand upon sliding movement of the assembly out of the armrest and contract to a narrower storage width upon sliding movement of the assembly into the armrest compartment. However, it has been found much more desirable to secure the beverage holding assembly for pivotal movement into and out of the armrest compartment as in the Dykstra and Lindberg assemblies, instead of the Flowerday sliding movement.

The beverage holding assembly of the Dykstra assembly reference is deficient in that the two semi-circular arms must be manually folded and unfolded in order to establish the beverage receptacle area and to collapse the beverage receptacle area before storing the assembly compactly in the armrest compartment.

SUMMARY OF INVENTION AND ADVANTAGES

The subject invention contemplates a beverage container holding assembly for use in a vehicular armrest. The assembly comprises a girth support means having at least one moveable arm for surrounding and supporting the side wall of a beverage container. A hinge means defines a hinge axis for rotatably connecting the girth support means to an armrest. The invention is characterized by the girth support means including a collapsing means for moving the arm between a support position and a storage position in a plane which is continuously parallel to the hinge axis to allow compact storage of the assembly in a receptacle.

The unique movement of the arm of the subject invention provides a beverage container holding assembly which is both structurally sound and aesthetically appeasing. Also, the collapsing means provides for compact storage of the assembly in a receptacle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a top view of the subject invention showing the beverage container holding assembly in an operational position;

FIG. 5 is a top view of the subject invention as in FIG. 4 and showing the beverage container holding assembly in the storage position;

FIG. 8 is a cross-sectional view of the beverage container holding assembly as taken along lines 8—8 of FIG. 5;

FIG. 9 is a cross-sectional view of the beverage container holding assembly as taken along lines 9—9 of FIG. 4;

FIG. 13 is an enlarged view of the area circumscribed at 13 in FIG. 2 showing the latch means of the subject invention;

FIG. 14 is an enlarged cross-sectional view of the latch means as shown in FIG. 13 with the entire armrest rotated to a vertical position; and FIG. 15 is a perspective view of the receptacle hinge of the subject invention.

DETAILED DESCRIPTION OF THE PREFERRED EMBODIMENT

Figure 1:
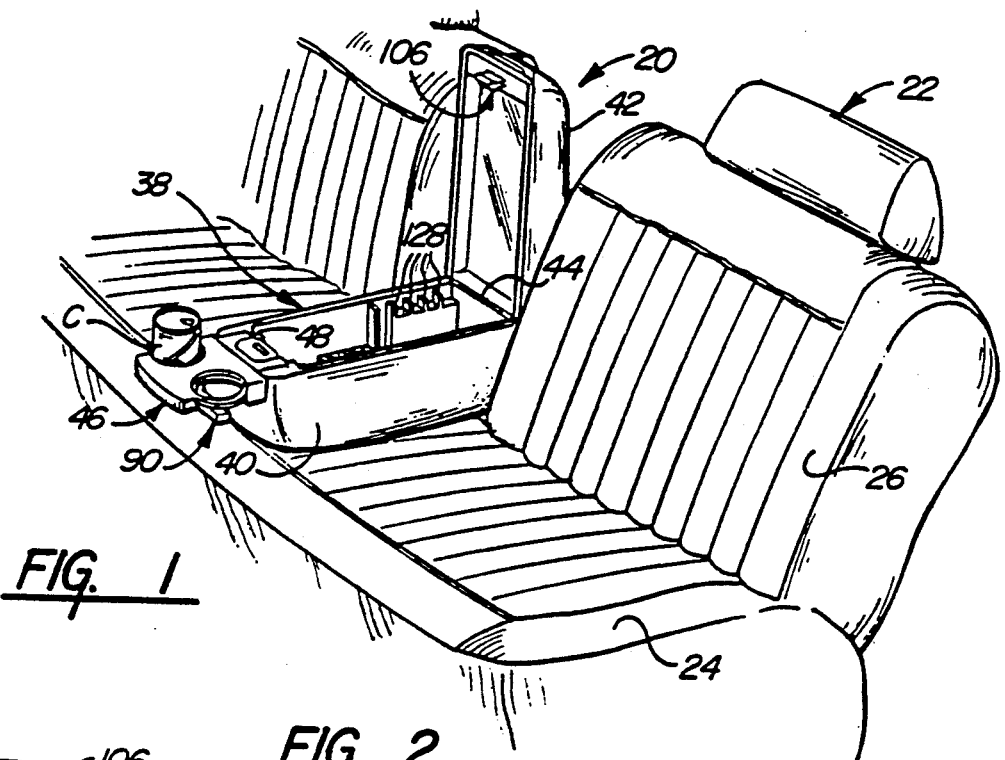
FIG. 1 is a perspective view of the subject invention disposed for use with a vehicular seating assembly.

Referring to the Figures wherein like numerals indicate like or corresponding parts throughout the several views, a vehicular armrest assembly is generally shown at 20. Preferably, the armrest 20 is provided with a comfortable, cushioned exterior conducive to prolonged contact with the forearm portion of a passenger in the vehicle.

The armrest assembly 20 is mounted in association with a vehicular seating assembly, generally indicated at 22. The seating assembly 22 typically includes a horizontal seat cushion 24 and a generally vertical backrest cushion 26. The subject armrest assembly 20 is mounted for pivotal movement between a generally horizontal position wherein the elongated armrest assembly 20 is generally parallel to the surface of the seat cushion 24, and a generally vertical position wherein the armrest assembly 20 is generally parallel the surface of the backrest cushion 26.

Figure 2:
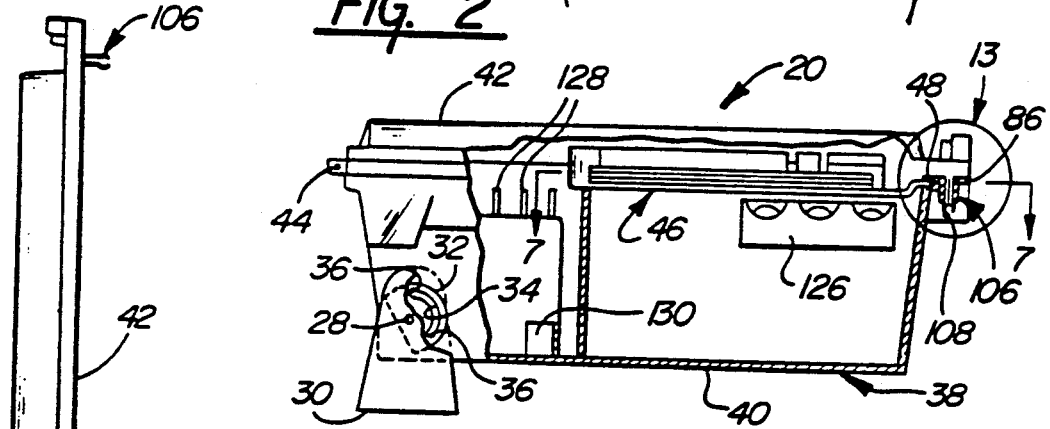
FIG. 2 is a side elevation view of the subject invention shown in partial cross-section.
Figure 3:
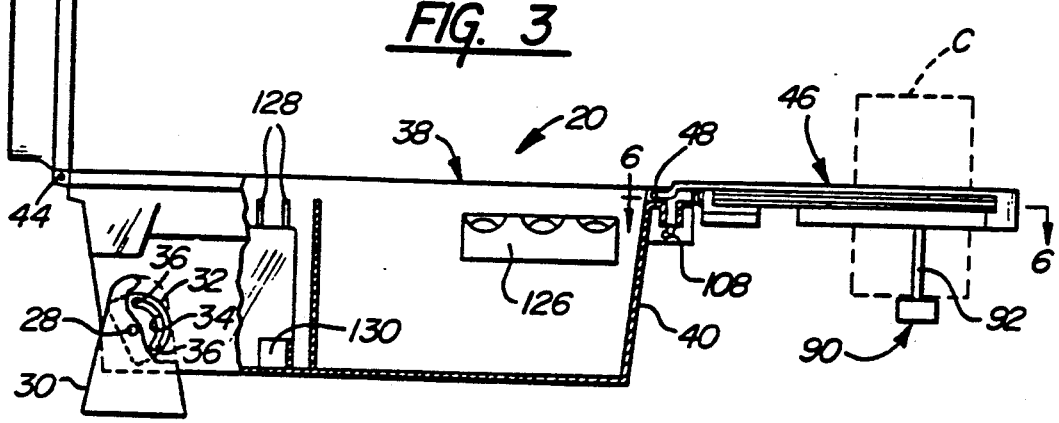
FIG. 3 is a side elevation view of the subject invention as in FIG. 2 and showing the beverage container holding assembly in an operational position and a lid of the armrest in an open position.

Referring to FIGS. 1 through 3, movement of the armrest assembly 20 between the horizontal and vertical positions is accomplished through an adjustment means comprising a pivotal connection 28 which includes a stanchion 30 disposed on each side of the armrest assembly 20 and fixedly connected to the vehicle floor board or seating assembly 22. A guide member 32 is fixed to the armrest assembly 20 and includes an arcuate slot 34 concentrically disposed about the pivotal connection 28. A pin (not shown) extends from each stanchion 30 into the concentric slot 34 of the guide member 32. As the arm rest assembly 20 is rotated between the horizontal and vertical positions, the pin disposed in the concentric slot 34 effectively establishes the limits of travel for the armrest assembly 20. In order to provide a positive feel for the user of the armrest assembly 20, the two ends of the arcuate slot 34 are formed with an enlarged opening 36. The pin extending from the station 30 is sized so as to loosely fit in the enlarged openings 36 at each end of the slot 34, but to tightly fit in the slot 34 so that upon reaching the vertical position or horizontal position, the armrest assembly 20 will provide feedback that it has reached its point of maximum movement.

As shown in FIGS. 1 through 5, the armrest assembly 20 includes a receptacle means 38 having a predetermined receptacle width for inclusion inside the vehicular armrest 20. The receptacle width is perhaps best viewed in FIGS. 4 and 5 as comprising the narrowest width measure of the elongated receptacle 38. The receptacle means 38 includes a lower compartment 40, an upper lid 42, and a receptacle hinge 44 which interconnects the lower compartment 40 and the lid 42. Therefore, access is gained to the receptacle 38 via the lid 42, as shown in FIG. 1.

A girth support means, generally indicated at 46, has a predetermined support width parallel to the receptacle width and larger than the receptacle width for surrounding and supporting the side wall of a beverage container C. The support width of the girth support means 46 is best shown in FIG. 4 as being measured parallel to the measure of the receptacle width. Therefore, the widest portion, or support width, of the girth support means 46 is larger than the width of the receptacle 38 of the arm rest assembly 20.

A hinge means 48 defines a hinge axis A which extends parallel to both the receptacle width of the armrest 20 and the support width of the girth support means 46. The hinge means 48 rotatably connects the girth support means 46 to the receptacle means 38 of the arm rest 20 for allowing arcuate movement of the girth support means 46 between a storage condition disposed in the receptacle 38 and an operational position outside the receptacle 38. FIGS. 1, 3 and 4, the girth support means 46 is shown in the operational position outside of the receptacle 38. Alternatively, in FIGS. 2 and 5 the girth support means 46 is shown in the storage condition disposed in the receptacle 38. Therefore, the hinge means 48 establishes a pivotal connection between the lower compartment 40 of the receptacle 38 and the girth support means 46 such that the girth support means 46 is moveable in an arcuate path about the hinge axis A between an operational position and a storage position.

The invention is characterized by including a collapsing means, generally indicated at 50 in FIGS. 5 through 12, for automatically collapsing the support width to a dimension smaller than the receptacle width in response to arcuate movement of the girth support means 46 toward the storage condition. The collapsing means 50 allows the girth support means 46 to be compactly stored in the midst of the receptacle 38. Therefore, as perhaps best shown in FIGS. 4 and 5, the collapsing means 50 reduces the support width to a smaller storage width as the girth support means 46 is rotated about the hinge axis A from the operational position to the storage position so that the girth support means 46 can be compactly stored in the receptacle 38 of the armrest assembly 20.

The collapsing means 50 includes an actuator means, generally indicated at 52 in FIGS. 5 through 12, for coacting with a portion of the lower compartment 40 adjacent to the hinge means 48 to actuate the collapsing means 50. Therefore, the actuator means 52 engages and coacts with the lower compartment 40 upon rotation of the girth support means 46 about the hinge axis A at a location on the lower compartment 40 which is proximate the hinge means 48.

The girth support means 46 includes a first articulated arm 54 which is moveable in a curvilinear path in response to actuation of the collapsing means 50. That is, the first arm 54 is caused to move as the collapsing means 50 is actuated, which in turn is responsive to the movement of the girth support means 46 about the hinge axis A. A pivot means, or member, 56 is disposed between the first arm 54 and the girth support means 46 for establishing an arcuate movement of the first arm 54 within a plane which is continuously parallel to the hinge axis A of the hinge means 48. Therefore, the pivot member 56 causes rotation of the first arm 54 about an axis which is perpendicular to the hinge axis A so that the arm 54 can move within a plane which remains parallel to the hinge axis A at all times.

Figure 6:
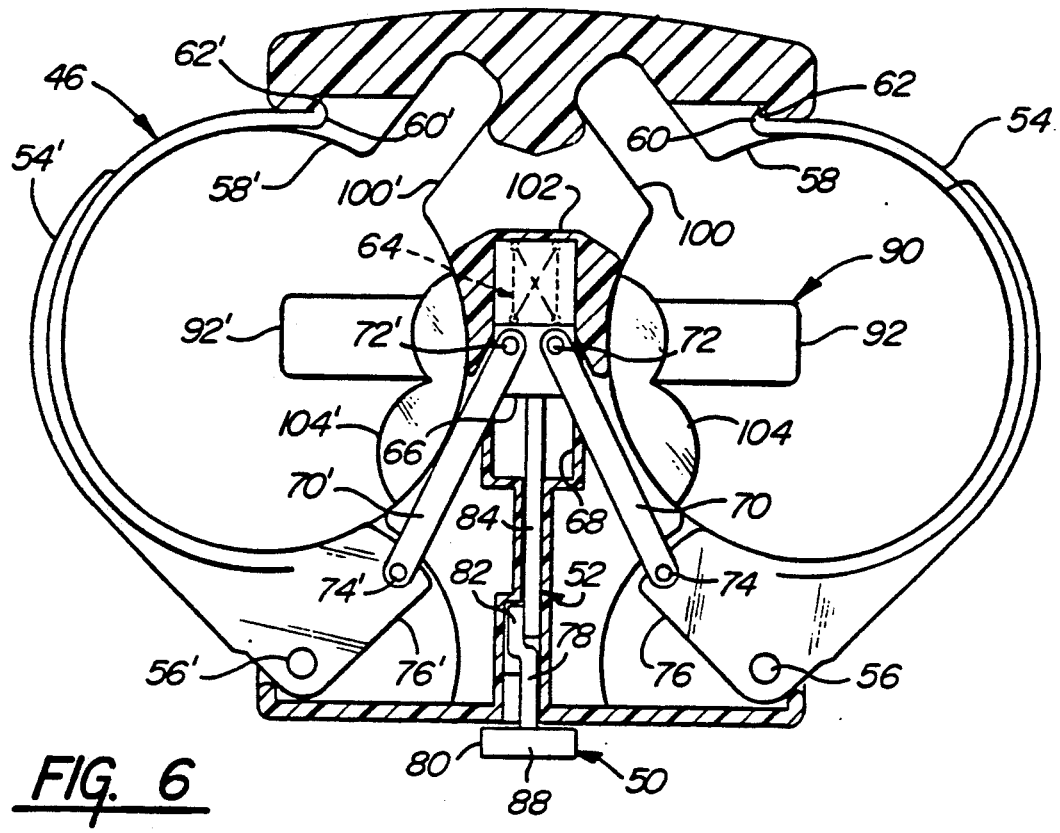
FIG. 6 is a cross-sectional view of the beverage container holding assembly as taken along lines 6—6 of FIG. 3.
Figure 7:
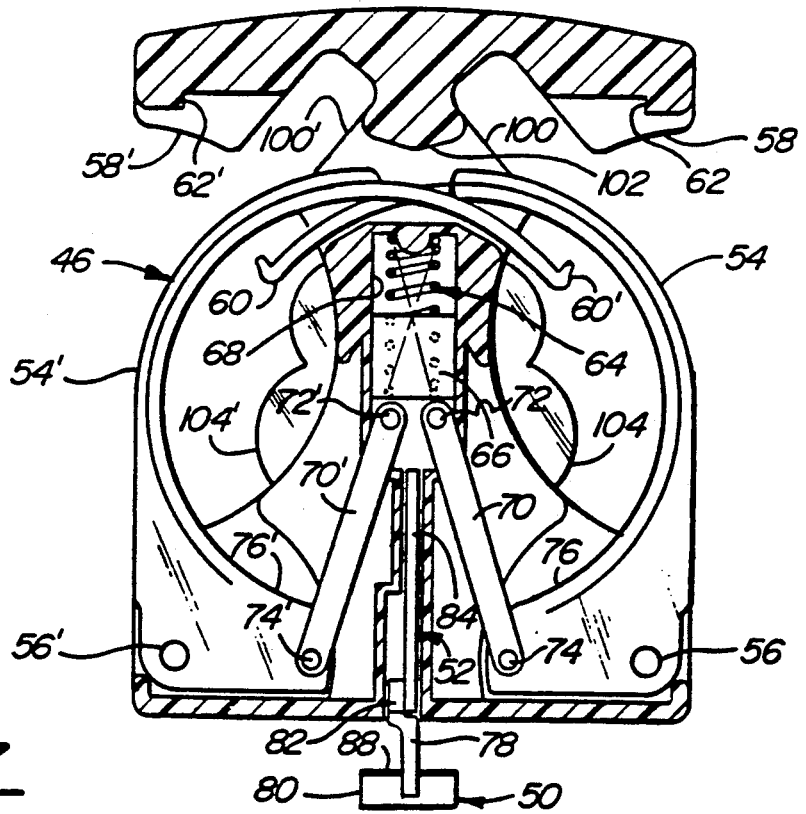
FIG. 7 is a cross-sectional view of the beverage container holding assembly as taken along lines 7—7 of FIG. 2.

The girth support means 46 also includes a stationary first wall 58 which is disposed opposite the first arm 54 and fixed relative to the pivot member 56. The first arm 54 and the first wall 58 each have a generally semi-circular shaped inner periphery for forming a generally circular shaped beverage container support area when the girth support means 46 is expanded to the support width, as shown in FIG. 6. That is, the first arm 54 and the first wall 58 have confronting inner peripheries which are generally semi-circular shaped and arranged so as to form a circular-shaped beverage container support area when the girth support means 46 is fully expanded in the support width. The pivot member 56 is disposed outside of the beverage container support area and causes the first arm 54 to move relative to the first wall 58 in such a manner that the inner peripheries in the first arm 54 and first wall 58 form a pointed eliptical, or football, shape when collapsed to the storage position, as illustrated in FIG. 7.

The first arm 54 includes a distal tip 60 which is spaced remotely from the pivot member 56 so as to sweep an arcuate path about the pivot member 56. The distal tip 60 extends in a generally radially outward direction from the pivot member 56 and from the circular area defined by the beverage container support area. The first wall 58 includes a tab portion 62 which is disposed for interlocking with the distal tip 60 of the first arm 54 when the girth support means 46 is expanded to the support width as shown in FIG. 6. The primary function of the interlocking distal tip 60 and tab portion 62 is to prevent expansion of the support width beyond the preferred beverage container support area. In other words, if a relatively heavy beverage container (C) is placed in the circular support area between the first wall 58 and the first arm 54, and intertial forces or gravitational forces urge the side wall of the beverage container (C) to bear against the first arm 54 in a radially outward direction, the interlocking distal tip 60 and tab portion 62 effectively maintain, or lock, the girth support means 46 at its support width and thereby prevent damage to the assembly.

As shown in FIGS. 6 through 9, the collapsing means 50 includes a biasing means, generally indicated at 64, which is operatively connected to the girth support means 46 and continuously urges the girth support means 46 toward the storage width. A slider element 66 is disposed for linear reciprocating movement within a cylinder 68 disposed in the first wall 58. The slider element 66 is operatively connected to the actuator means 52 for linear movement in response to actuation of the actuator means 52. The biasing means 64 includes a compression spring which is disposed in the cylinder 68 and extends between the slider element 66 and a portion of the first wall 58.

A drag link 70 extends between a first end 72 and a second end 74 thereof. The first end 72 is pivotally connected to the slider element 66, whereas the second end 74 is pivotally connected to a lever portion 76 of the first arm 54. Therefore, as the slider element 66 moves in the cylinder 68, the drag link 70 connected to the lever portion 76 of the first arm 54 causes the first arm 54 to pivot about the pivot member 56. The biasing means 64 which urges the slider element 66 in a predetermined direction thus urges the first arm 54 to move toward its storage width position.

Referring to FIGS. 8 and 9, the actuator means 52 includes a bell crank 78 having a driver end 80 which is disposed for engaging the portion of the lower compartment 40, and a driven end 82 opposite the driver end 80. A connecting rod 84 extends between opposite ends with one of its ends being pivotally connected to the slider element 66 and the other of its ends being pivotally connected to the driven end 82 of the bell crank 78. Therefore, as the actuator means 52 is actuated upon rotation about the hinge axis A, the driver end 80 of the bell crank 78 engages a portion of the lower compartment 40 thereby moving the driven end 82 of the bell crank 78 which, in turn, linearly reciprocates the slider element 66 through the connecting rod 84.

Figure 10:
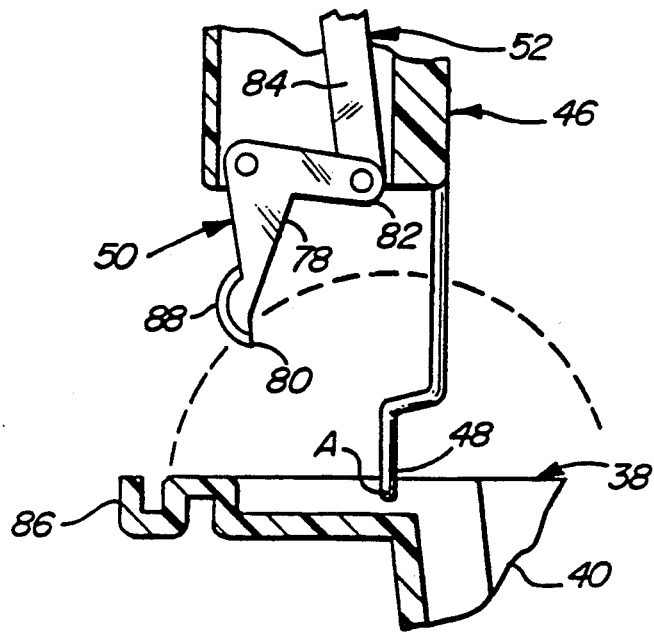
FIG. 10 is an enlarged cross-sectional view of a portion of the actuator means shown in an arcuate position midway between the storage position and the operational position.
Figure 11:
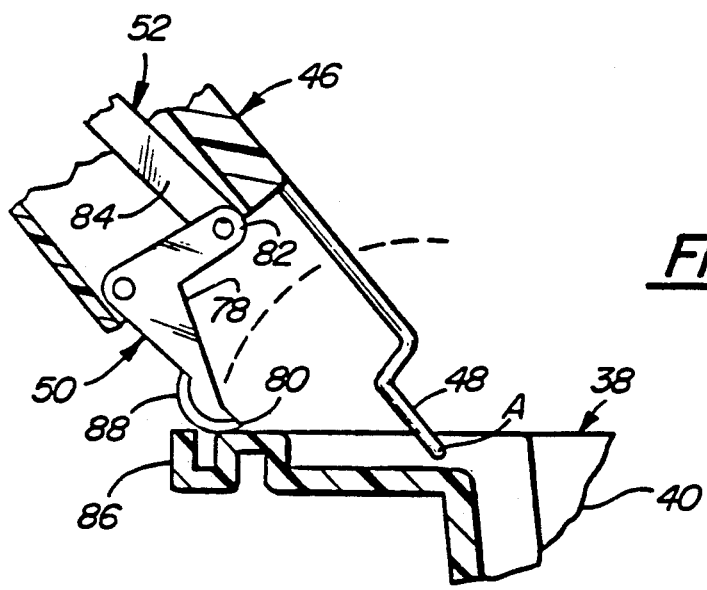
FIG. 11 is an enlarged cross-sectional view as in FIG. 10 showing an arcuate progression of the beverage container holding assembly toward the operational position.
Figure 12:
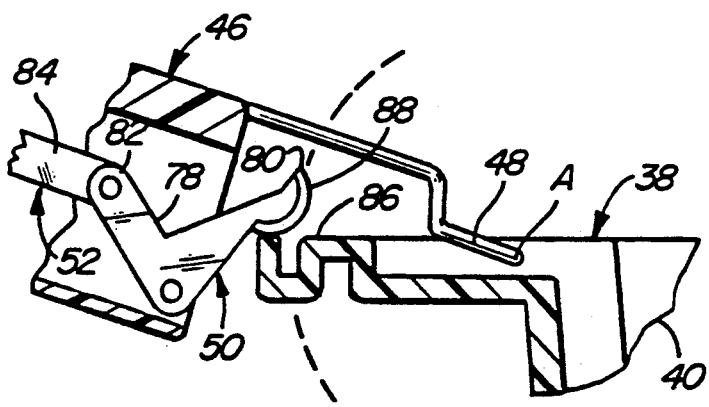
FIG. 12 is an enlarged cross-sectional view as in FIG. 11 showing yet a further arcuate progression of the beverage container holding assembly toward the operational position.

More particularly, the lower compartment 40 of the receptacle 38 includes an outwardly extending lip 86 which is adapted to engage the driver end 80 of the bell crank 78. Accordingly, the driver end 80 of the bell crank 78 is provided with a smooth caming surface 88 which smoothly engages and slides over the lip portion 86 of the lower compartment, as illustrated in FIGS. 10 through 12. As the girth support means 46 is moved from the operational position to the collapsed storage position, the caming surface 88 of the driver end 80 smoothly slides over the lip portion 86 of the lower compartment 40 and, with the force of the biasing means 64, automatically collapses the support width of the girth support means 46 to allow for compact storage in the receptacle 38.

As best shown in FIGS. 8 and 9, a bottom support means, generally indicated at 90, is provided for supporting the bottom of the beverage container C. The bottom support means 90 includes an L-shaped bar 92 which is moveable between an operational position when the girth support means 46 is expanded to the support width shown in FIG. 9, and a storage position when the girth support means 46 is collapsed to the storage width as shown in FIG. 8.

A gravity centering means, generally indicated at 94, centers the bar 92 along a diameter of the circular inner periphery of the first arm 54 and the first wall 58 in response to the gravitational force when the bar 92 is in the operational position. More specifically, the gravity centering means 94 includes a T-shaped tooth 96 integral with the bar 92 which matingly engages a correspondingly shaped coacting pocket 98 disposed in the first wall 58. The tooth 96 disposed in the pocket 98 maintains the L-shaped bar 92 in an orientation extending generally perpendicularly downwardly from the girth support means 46, as shown in FIG. 9. However, upon movement of the girth support means 46 to the storage position, the tooth 96 freely moves out of the pocket 98 due to the gravitational forces acting upon the bar 92 and compactly nests adjacent the underside of the girth support means 46, as shown in FIG. 8.

Referring again to FIG. 6, the first wall 58 includes a radially extending opening 100 which is adapted to receive a handle of a beverage container, such as a coffee mug. Also the first wall 58 includes a passage 102 which is best shown in FIGS. 7 through 9, through which the distal tip 60 of the first arm 54 passes as it moves between the terminal storage width and the support width positions.

In FIGS. 1 and 4 through 7, the preferred embodiment of the subject invention is shown including a second articulated arm 54' which is disposed oppositely the first arm 54. The second arm 54' moves in unison with the first arm 54 in an opposite arcuate direction relative to the first arm 54 and within a plane which is also continuously parallel to the hinge axis A. As best shown in FIGS. 6 and 7, and second arm 54' is pivoted about a second pivot member 56' for arcuate movement between a storage width and a support width position just as the first arm 56. A second stationary wall 58' is integral with the first wall 58 and cooperates with the second arm 54' in exactly the same manner as described above. The first 58 and second 58' walls are disposed back-to-back to form an integral unit commonly supporting the cylinder 68, slider element 66, biasing means 64 and actuator means 52.

A second drag link 70' is coupled between the slider element 66 and a lever portion 76' of the second arm 54'. Therefore, as the actuator means 52 urges the slider element 66 to move back and forth within the cylinder 68, the two drag links 70, 70' operate in unison to rotate the respective arms 54, 54' about their associated pivot members 56, 56', as the girth support means 56 is rotated about the hinge axis A such that the arms 54, 54', walls 58, 58' and actuator means 52 rotate about the hinge axis A as an integral rotating unit.

In like manner, the bar 92 of the bottom support means 90 includes a second integrally extending L-shaped member associated with the second arm 54' and second wall 58' such that the unitary bar 92 of the preferred embodiment forms a generally T-shape.

A resilient stabilizer pad 104 is fixedly connected to the first wall 58 and extends radially inwardly therefrom for engaging and stabilizing a beverage container C disposed within the beverage container support area. Likewise, a second stabilizer pad 104' extends inwardly from the second 58' to perform the same function for a beverage container C disposed within the beverage container support area of the second arm 54' and second wall 58'.

Referring to FIGS. 13 and 14, a portion of the lower compartment 40 and lid 42 of the receptacle 38 is shown including a latch means, generally indicated at 106, for releasably latching the lid 42 to the lower compartment 40. The latch means 106 includes an automatic locking means, generally indicated at 108, for automatically locking the lid 42 and the lower compartment 40 in a fastened condition when the receptacle 38 is in a vertical position, as shown in FIG. 14. More particularly, as the armrest assembly 20 is pivoted about the pivotal connection 28 so that it extends generally parallel to the surface of the backrest cushion 26, the automatic locking means 108 prevents the separation of the lid 42 from the lower compartment 40.

This is accomplished by securing a deflectable fork member 110 to the lid 42 and providing a fork slot 112 in the lower compartment 40 adapted to receive the fork member 110. The fork member 110 includes bulged distal tips 114 which have a width measure slightly larger than the width of the slot 112 so that insertion of the fork member 110 into the slot 12 necessitates an inward flexure of the bulged tips 114. The bulged tips 114 are allowed to re-expand to a free state condition upon passage completely through the slot 112 to thereby releasably fasten the lid 42 to the lower compartment 40.

The automatic locking means 108 includes a falling cylinder 116 disposed for movement with the force of gravity in an arcuate channel 118. The channel 118, cylinder 116 and bulged tips 114 are so disposed that upon movement of the armrest assembly 22 a vertical position, as shown in FIG. 14, the cylinder 116 rolls through the channel 116 to a position between the two bulged tips 114. The presence of the cylinder 116 intermediate the two bulged tips 114 prevents inward flexure of the fork member 110 to thereby prevent removal of the fork member 110 from the slot 112. When the armrest assembly 20 is returned to the horizontal position, the cylinder 116 rolls back to the position shown in FIG. 13 thereby allowing the lid 42 to be opened again.

In FIG. 15, the receptacle hinge 44 is shown including a plurality of lid fingers 120 which extend outwardly from and are integrally connected to the lid 42. Similarly a plurality of lower compartment fingers 122 are disposed adjacent the lid fingers 120 and are integrally connected to the lower compartment 40. Each of the lid fingers 120 and lower compartment fingers 122 are arranged in a juxtaposed or interposed relationship, and include two coaxially aligned hinge pins 124 extending therethrough. As perhaps best shown in FIG. 1, the pivotal axis formed by the hinge pin 124 of the receptacle hinge 44 is parallel to the hinge axis A.

In FIGS. 1 though 5, the receptacle 38 is shown to include a plurality of accessory features including a removable coin holder 126 supported on the inner side wall of the lower compartment 40. Additionally, a plurality of widthwise partitions 128 extending parallel to the hinge axis A are provided for supporting an array of cassette tape cases. Further, a plurality of lengthwise partitions 130 extend perpendicular to the hinge axis A and are fixedly attached to the lower floor portion of the lower compartment 40 and disposed to receive and securely hold a plurality of compact disc cases.

OPERATION OF THE PREFERRED EMBODIMENT

The subject invention provides a method for supporting and storing a beverage container holding assembly 46 which comprises the steps of providing a beverage container holding assembly 46 having a support width, as shown in FIGS. 4 and 6, providing a storage receptacle 38 having a receptacle width, best shown in FIGS. 4 and 5, and providing a hinge means 48 for interconnecting the assembly 46 and the storage receptacle 38 for relative rotation about the hinge axis A which, as described above, extends parallel to the storage width and the receptacle width. The method of the subject invention is characterized by automatically collapsing the storage width of the assembly to a width smaller than the receptacle width, as shown in FIG. 5, as the assembly 46 is rotated into the storage receptacle 38 and then automatically expanding the storage width of the assembly 46 as the assembly 46 is rotated away from the storage receptacle 38, as shown in FIG. 4. As the assembly 46 is rotated from the storage position in the storage receptacle 38 to the operational position, the T-shaped bar 92 of the bottom support means 90 is moved to a lower support position for supporting the bottom of the beverage container C.

As best shown in FIGS. 6 through 12, the above described method is accomplished by the driver end 80 of the bell crank 78 engaging and camingly coacting with the lip 86 of the lower compartment 40 such that the connecting rod 84 displaces the slider element 66. Such displacement of the slider element 66 causes the drag links 70, 70' to pull on the lever portions 76, 76' of the first 54 and second 54 arms thereby urging them to rotate about their respective pivot members 56, 56'. These structures are so arranged that full rotation of the assembly 46 to the operational position moves the slider element 66 to a terminal stroke position in the cylinder 68, and also causes engagement of the respective distal tips 60, 60' of the first 54 and second 54' arms against the tab portions 62, 62' of the first and second walls 58, 58'.

As the assembly 46 is rotated from the operational position back to a recessed storage position inside the receptacle 38, the counteracting force of the biasing means 64 urges the slider element 66 to move rearwardly in the cylinder 68 thereby moving the first 54 and second 54' arms toward each other to thereby collapse the support width to the storage width and allow for compact storage of the assembly 46 in the receptacle 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A beverage container holding assembly for use in a vehicular armrest (20), said assembly comprising: girth support means (46) having at least one moveable first arm (54) and a stationary first wall (58) disposed opposite said first arm (54) for surrounding and supporting the side wall of a beverage container (C); hinge means (48) defining a hinge axis (A) for rotatably connecting said girth support means (46) to an armrest (20); and characterized by said girth support means (46) including collapsing means (50) for moving the entirety of said first arm (54) between a support position and a storage position in a plane continuously parallel to said hinge axis (A) toward and away from said first wall (58) while maintaining said first wall (58) fixed relative to said plane of first arm (54) movement to allow compact storage of said assembly in a receptacle (38).

2. An assembly as set forth in claim 1 wherein said arm (54) comprises a first arm (54), further characterized by said first arm (54) including pivot means (56) for moving said first arm (54) in a curvilinear path between said support position and said storage position.

3. An assembly as set forth in claim 2 wherein said first arm (54) includes a distal tip (60) spaced from said pivot means (56), further characterized by said first wall (58) including a tab portion (62) for interlocking with said distal tip (60) of said first arm (54) when said girth support means (46) is expanded to said support width.

4. An assembly as set forth in claim 2 further characterized by said first arm (54) and said first wall (58) each having generally semi-circular shaped inner peripheries for forming a generally circular shaped beverage container support area when said girth support means (46) is moved to said support position.

5. An assembly as set forth in claim 4 further characterized by said collapsing means (50) including actuator means (52) for coacting with a portion of the receptacle (38) to actuate said collapsing means (50) upon rotation of said girth support means (46) about said hinge axis (A).

6. An assembly as set forth in claim 5 further characterized by biasing means (64) operatively connected to said first arm (54) for urging said first arm (54) toward said storage position.

7. An assembly as set forth in claim 6 further characterized by including bottom support means (90) for supporting the bottom of the beverage container (C).

8. An assembly as set forth in claim 7 further characterized by girth support means (46) including a bar (92) moveable between an operational position when said girth support means (46) is moved to said support position and a recessed position when said girth support means (46) is moved to said storage position.

9. An assembly as set forth in claim 8 further characterized by including gravity centering means (94) for centering said bar (92) along a diameter of said circular inner periphery of said first arm (54) and said first wall (58) in response to the gravitational force when in said operational position.

10. An assembly as set forth in claim 9 further characterized by said gravity centering means (94) including a generally T-shaped tooth (96) extending from said bar (92) and a matingly shaped coacting pocket (98) disposed in said first wall (58).

11. An assembly as set forth in claim 7 and further characterized by said collapsing means (50) including a slider element (66) disposed for linear reciprocating movement and operatively connected to said actuator means (52) for linear movement in response to actuation of said actuator means (52).

12. An assembly as set forth in claim 11 further characterized by said biasing means (64) including a compression spring extending between said slider element (66) and said first wall (58).

13. An assembly as set forth in claim 12 further characterized by said collapsing means (50) including a drag link (70) extending between a first end (72) and a second end (74,) thereof with said first end (72) pivotally connected to said slider element (66) and said second end (74) pivotally connected to said first arm (54).

14. An assembly as set forth in claim 13 further characterized by said actuator means (52) including a bell crank (78) having a driver end (80) disposed for engaging the armrest (20) and a driven end (82) opposite said driver end (80).

15. An assembly as set forth in claim 14 further characterized by said actuator means (52) including a connecting rod (84) extending between opposite ends with one of said ends being pivotally connected to said slider element (66) and the other of said ends being pivotally connected to said driven end (82) of said bell crank (78).

16. An assembly as set forth in claim 15 further characterized by said first wall (58) including a radially extending opening (100) adapted to receive a handle of the beverage container (C).

17. An assembly as set forth in either of claims 2 or 16 further characterized by including a second articulated (54') arm adjacent said first arm (54) and moveable in unison therewith in an opposite arcuate direction relative to said first arm (54) within a plane continuously parallel to said hinge axis (A).

18. A beverage container holding assembly for use in a vehicular armrest (20), said assembly comprising: receptacle means (38) for inclusion in a vehicular armrest (70); girth support means (46) having at least one movable first arm (54) and a stationary first wall (58) disposed opposite said first arm (54) for surrounding and supporting the side wall of a beverage container (C); hinge means (48) defining a hinge axis (A) for rotatably connecting said girth support means (46) to said receptacle means (38) for arcuate movement between a storage condition disposed in said receptacle means (38) and an operational condition outside said receptacle means (38); and characterized by said girth support means (46) including collapsing means (50) for moving the entirety of said first arm (54) between a support position and a storage position in a plane continuously parallel to said hinge axis (A) toward and away from said first wall (58) while maintaining said first wall (58) fixed relative to said plane of first arm (54) movement to allow compact storage of said girth support means (46) in said receptacle means (38).

19. An assembly as set forth in claim 18 further characterized by said receptacle means (38) including a lower compartment (40), an upper lid (42) and a receptacle hinge (44) interconnecting said lower compartment (40) and said upper lid (42).

20. An assembly as set forth in claim 19 further characterized by said hinge means (40) being connected to said lower compartment (40).

21. An assembly as set forth in claim 20 wherein said arm (54) comprises a first arm (54), further characterized by said first arm (54) including pivot means (56) for moving said first arm (54) in a curvilinear path between said support position and said storage position.

22. An assembly as set forth in claim 21 wherein said first arm (54) includes a distal tip (60) spaced from said pivot means (56), further characterized by said first wall (58) including a tab portion (62) for interlocking with said distal tip (60) of said first arm (54) when said first arm (54) is in said support position.

23. An assembly as set forth in claim 21 further characterized by said first arm (54) and said first wall (58) each having generally semi-circular shaped inner peripheries for forming a generally circular shaped beverage container support area when said girth support means (46) is moved to said support position.

24. An assembly as set forth in claim 23 further characterized by said collapsing means (50) including actuator means (52) for coacting with portion of said lower compartment (40) adjacent said hinge means (48) to actuate said collapsing means (50).

25. An assembly as set forth in claim 24 further characterized by including biasing means (64) operatively connected to said first arm (54) for urging said first arm (54) toward said storage position.

26. An assembly as set forth in claim 25 further characterized by including bottom support means (90) for supporting the bottom of the beverage container (C).

27. An assembly as set forth in claim 26 further characterized by said bottom support means (90) including a bar (92) moveable between an operational position when said girth support means (46) is moved to said support position and a recessed position when said girth support means (46) is moved to said storage position.

28. An assembly as set forth in claim 27 further characterized by gravity centering means (94) for centering said bar (92) along a diameter of said circular inner periphery of said first arm (54) and said first wall (58) in response to the gravitational force when in said operational position.

29. A assembly as set forth in claim 28 further characterized by said gravity centering means (94) including a generally T-shaped tooth (96) extending from said bar (92) and a matingly shaped coacting pocket (98) disposed in said first wall (58).

30. An assembly as set forth in claim 26 further characterized by said collapsing means (50) including a slider element (66) disposed for linear reciprocating movement and operatively connected to said actuator means (52) for linear movement in response to actuation of said actuator means (52).

31. An assembly as set forth in claim 30 further characterized by said biasing means (64) including a compression spring extending between said slider element (66) and said first wall (54).

32. An assembly as set forth in claim 30 further characterized by said collapsing means (50) including a drag link (70) extending between a first end (72) and a second end (74) thereof with said first end (72) pivotally connected to said slider element (66) and said second end (74) pivotally connected to said first arm (54).

33. An assembly as set forth in claim 32 further characterized by said actuator means (52) including a bell crank (78) having a driver end (80) disposed for engaging said portion of lower compartment (40) and a driven end (82) opposite said driver end (80).

34. An assembly as set forth in claim 33 further characterized by said actuator means (52) including a connecting rod (84) extending between opposite ends with one of said ends being pivotally connected to said slider element (66) and the other of said ends being pivotally connected to said driven end (82) of said bell crank (78).

35. An assembly as set forth in claim 34 further characterized by said first wall (58) including a radially extending opening (100) adapted to receive a handle of the beverage container (C).

36. An assembly as set forth in claim 35 further characterized by said receptacle (44) hinge including a plurality of lid fingers (120) extending outwardly from and integrally connected to said lid (42) and a plurality of lower compartment fingers (122) disposed adjacent said lid fingers (120) and integrally connected to said lower compartment (40).

37. An assembly as set forth in claim 36 further characterized by said receptacle means (38) including larch means (106) for releasably latching said lid (42) to said lower compartment (40).

38. An assembly as set forth in claim 37 further characterized by said receptacle means (38) including adjustment means for adjusting the angle of said receptacle means (38) relative to a vehicular seating assembly (22) between a substantially horizontal position and a substantially vertical position.

39. An assembly as set forth in claim 38 further characterized by said latch means (106) including automatic locking means (108) for automatically locking said lid (42) and said lower compartment (40) in a fastened condition when said receptacle means (38) is in said vertical position.

40. An assembly as set forth in either of claims 21 or 39 further characterized by including a second articulated arm (54,) adjacent said first arm (54) and moveable in unison therewith in an opposite arcuate direction relative to said first arm (54) within a plane continuously parallel to said hinge axis (A).

41. An assembly as set forth in claim 40 further characterized by said hinge axis (A) and the axis of said receptacle hinge (44) being parallel.

* * * * *